US009097049B2

(12) United States Patent
Sakai

(10) Patent No.: US 9,097,049 B2

(45) Date of Patent: Aug. 4, 2015

(54) OPENING-CLOSING CONTROL DEVICE AND OPENING-CLOSING CONTROL METHOD

(71) Applicant: ASMO CO., LTD., Kosai, Shizuoka-pref. (JP)

(72) Inventor: Shin Sakai, Kosai (JP)

(73) Assignee: ASMO CO., LTD., Shizuoka-pref. (JP)

( * ) Notice: Subject to any disclaimer, the term of this patent is extended or adjusted under 35 U.S.C. 154(b) by 45 days.

(21) Appl. No.: 14/141,597

(22) Filed: Dec. 27, 2013

(65) Prior Publication Data

US 2014/0196252 A1 Jul. 17, 2014

(30) Foreign Application Priority Data

Jan. 17, 2013 (JP) ................................ 2013-006602

(51) Int. Cl.

*H02P 1/00* (2006.01)
*E05F 1/00* (2006.01)
*E05F 15/695* (2015.01)
*E05F 15/41* (2015.01)

(52) U.S. Cl.

CPC ............... *E05F 1/002* (2013.01); *E05F 15/695* (2013.01); *E05F 15/41* (2013.01); *Y10T 16/56* (2013.01)

(58) Field of Classification Search

CPC ...................................................... E05F 1/002
USPC .......................... 318/266, 265, 264, 256, 255
See application file for complete search history.

(56) References Cited

U.S. PATENT DOCUMENTS 7,073,291 B2 * 7/2006 Kawanobe et al. ............... 49/26

FOREIGN PATENT DOCUMENTS

JP 2003-003743 A 1/2003

* cited by examiner

*Primary Examiner* — David S Luo
(74) *Attorney, Agent, or Firm* — Posz Law Group, PLC

(57) ABSTRACT

An opening-closing control device drives an opening-closing member with use of a drive device and controls the opening-closing member to open or close an opening portion. The opening-closing control device includes a load detector and a drive-force stopping device. The load detector detects an increase of load on the opening-closing member due to pressing of the opening-closing member against an elastic member that is disposed on an end of the opening portion and is opposed to the opening-closing member in a moving direction of the opening-closing member. The drive-force stopping device stops a drive force supplied to the drive device at a timing just before the opening-closing member reaches a mechanically limit position in a closing direction of the opening-closing member when the increase of load is larger than a predetermined threshold.

8 Claims, 9 Drawing Sheets

OPENING-CLOSING CONTROL DEVICE AND OPENING-CLOSING CONTROL METHOD

CROSS REFERENCE TO RELATED APPLICATION

This application is based on and incorporates herein by reference Japanese Patent Application No. 2013-006602 filed on Jan. 17, 2013.

TECHNICAL FIELD

The present disclosure relates to an opening-closing control device and an opening-closing control method which are capable of preventing uncomfortable impact noise with reducing excess impact force in a closing operation of an opening-closing member.

BACKGROUND

Conventionally, an opening-closing control device, such as a lifting and lowering device for a window of a vehicle, just applies a drive voltage to an electric motor to lift or lower the window. Thus, when a glass window 101 of a door 100 is fully closed as shown in FIGS. 6A and 6B, an end of the glass window 101 presses a glass run channel 102. The glass window 101 is driven until the window 101 is locked mechanically. Hence, excess impact force is applied to the glass window 101, a window frame 104 and a drive system (not shown). As a result, load on the drive system may be increased, and uncomfortable impact noise may occur.

In order to address the above problems, a technology is suggested in Patent Document 1 (JP 2003-003743 A). In Patent Document 1, a motor is shut off from source voltage and rotates by inertia to guide an opening-closing member to a fully closed position or a fully open position.

However, since it is assumed that the inertia force makes the opening-closing member reach the fully closed position, it cannot be known whether the opening-closing member moves to the fully closed position certainly.

Generally, an opening-closing member, such as a glass window, a sunroof or a slide door, is closed mechanically. Thus, the opening-closing member moves in a closing direction while a flat side surface of the opening-closing member is slightly tilted from the closing direction due to a backlash of a power transmission mechanism in a drive path. A glass window for a vehicle is taken for an example of the opening-closing member. As shown in FIGS. 7A to 7C, when the glass window 101 reaches a fully closed position, the glass window 101 is tilted from its closing direction. Hence, an end part of the glass window 101 shown in FIG. 7B contacts a glass run channel 102 before an end part of the glass window 101 shown in FIG. 7A contacts the glass run channel 102. The glass run channel 102 is an opposed member that is opposed to the glass window 101 in the closing direction.

Movement of the glass window 101 may stop when the end part of the glass window shown in FIG. 7B contacts the glass run channel 102. In this case, as shown in FIG. 7C, a clearance 105 is provided between the glass window 101 and the glass run channel 102. Hence, a sealing performance between the glass window 101 and the glass run channel 102 may reduce. Therefore, as shown in FIG. 7C, inflow of water may occur at the time of vehicle wash, or wind may flow through the clearance 105 to make wind noise. The glass window 101 is, for example, sealed by the glass run channel 102 as shown in FIG. 7B. The glass run channel 102 includes a base portion

102*a*, side portions 102*c* extending to define a groove portion 102*b* (space portion) therebetween, an inner lip portion 102*d*1 and an outer lip portion 102*d*2 which extend from ends of the side portions 102*c* into the groove portion 102*b* and press against each other in the groove potion 102*b*. When the glass window 101 is inserted into the groove portion 102*b*, the glass window 101 is sandwiched between the inner lip portion 102*d*1 and the outer lip portion 102*d*2 in a width direction of a vehicle. When the glass window 101 is further driven upward (to a closing side) from a position where the glass window 101 is in contact with the glass run channel 102, a lower portion of the glass window 101 may be displaced outward in the width direction of the vehicle. In this case, the glass window 101 may be displaced as shown by an arrow of FIG. 7D, and a clearance may be produced between the glass window 101 and a belt molding 106. This clearance may cause wind noise.

It may be preferable that both end parts of the opening-closing member on its closed side are attached firmly to the opposed member while an excess load is not applied to the drive system. The opposed member such as the glass run channel, which contacts the opening-closing member in a fully closed state, is made of an elastic material such as rubber-based material. Thus, when the drive motor is stopped to stop the movement of the glass window at the timing of contact of the glass window with the opposed member (glass run channel), a clearance may be produced due to the tilt during moving up depending on a door for a vehicle. Additionally, when the glass window is stopped at a position where the glass run channel contacts an upper end of the glass window, water may inflow between the glass run channel and the upper end of the glass window in high-pressure vehicle washing.

SUMMARY

It is an objective of the present disclosure to provide an opening-closing control device and an opening-closing control method which are capable of ensuring a sealing performance in a fully closing operation of an opening-closing member and preventing an impact noise while avoiding a drive system from being subjected to stress. More specifically, it is the objective to provide an opening-closing control device and an opening-closing control method which are capable of preventing excess deformation of an opposed member that is opposed to the opening-closing member while preventing the drive system from being subjected to an excess load even when the opening-closing member moves to a fully closed position with tilting slightly.

According to an aspect of the present disclosure, an opening-closing control device drives an opening-closing member with use of a drive device and controls the opening-closing member to open or close an opening portion. The opening-closing control device includes a load detector and a drive-force stopping device. The load detector detects an increase of load on the opening-closing member when the opening-closing member is located near a fully closed position in which the opening-closing member fully closes the opening portion. The increase of load is generated due to pressing of the opening-closing member against an elastic member that is disposed on an end of the opening portion and is opposed to the opening-closing member in a moving direction of the opening-closing member. The drive-force stopping device stops a drive force supplied to the drive device at a timing just before the opening-closing member reaches a mechanically limit position in a closing direction of the opening-closing member when the increase of load detected by the load detector is larger than a predetermined threshold.

Accordingly, the opening-closing control device of the present disclosure controls the opening-closing member when the opening-closing member is located in the vicinity of the fully closed position of the opening portion. Thus, erroneous stop of the opening-closing member can be prevented. For example, the opening-closing member can be prevented from stopping at the middle of the opening portion. Moreover, the supply of the drive force is stopped just before the opening-closing member reaches the mechanically limit position in the closing direction after the detection of the increase of load on the opening-closing member due to pressing of the opening-closing member against the elastic member. Hence, a load on the opening-closing member can be detected while the opening-closing member and the elastic member are pressed against each other entirely. Therefore, an end portion of the opening-closing member in its closing direction and the elastic member can be made to be in contact with each other with pressing against each other entirely. As a result, a sealing performance can be ensured. Furthermore, the supply of drive force is stopped after the detection of the increase of load and just before the opening-closing member reaches the mechanically limit position in the closing direction. Thus, an impact noise due to contact between the opening-closing member and an inner end portion of the opening portion can be prevented, and stress on the drive system driving the opening-closing member can be avoided.

The drive-force stopping device may stop the supply of drive force in a state where a position of the opening-closing member relative to the opening portion is changed due to the pressing of the opening-closing member against the elastic member.

If the opening-closing member is stopped when the opening-closing member starts to press the elastic member with tilting, a clearance may be produced between the opening-closing member and the elastic member, and a portion where a pressing force of the opening-closing member against the elastic member is relatively weak may be provided. As a result, a sealing performance may not be ensured. However, in the present disclosure, the supply of drive force may be stopped after the position of the opening-closing member relative to the opening portion is changed due to the pressing of the opening-closing member against the elastic member. The opening-closing member continues to move until the position of the opening-closing member relative to the opening portion changes after a part (end) of the opening-closing member starts to press the elastic member. Therefore, an entire of the end part of the opening-closing member can be in contact with the elastic member with pressing the elastic member. An impact noise at the time of closing can be reduced while sealing of the opening portion is ensured.

The drive-force stopping device may have a flat shape and may stop the supply of drive force just before an end portion of the opening-closing member opposite from the elastic member moves in a direction perpendicular to a flat surface of the opening-closing member.

Both side surfaces of the opening-closing member are made to be in contact with elastic sealing members for waterproof. If the opening-closing member is pressed against the elastic member and continues to receive supply of drive force (i.e., be pressed) even though the opening-closing member reaches the fully closed position, the end portion of the opening-closing member opposite from the elastic member may move and press one of the sealing members. Consequently, a sealing performance of the other of the sealing members, which is not pressed by the opening-closing member, may reduce. However, as in the present disclosure, the drive-force stopping device may stop the supply of drive force just before the end portion of the opening-closing member opposite from the elastic member moves in the direction perpendicular to the flat surface of the opening-closing device. As a result, the end portion of the opening-closing member opposite from the elastic member can be prevented from moving in the direction perpendicular to the flat surface of the opening-closing member, or can be confined to a small moving range. Therefore, a sealing performance can be ensured certainly.

The drive-force stopping device may stop the supply of drive force before the end portion of the opening-closing member opposite from the elastic member moves in a direction intersecting with the moving direction of the opening-closing member.

According to another aspect of the present disclosure, a method is for driving an opening-closing member with use of a drive device and controlling the opening-closing member to open or close an opening portion. In the method, it is detected that a load on the opening-closing member is increased to a predetermined threshold when the opening-closing member is located near a fully closed position at which the opening-closing member fully closes the opening portion. The increase of load is generated due to pressing of the opening-closing member against an elastic member that is disposed on an end of the opening portion and is opposed to the opening-closing member in a moving direction of the opening-closing member. In the method, a drive force supplied to the drive device is stopped after detecting, at a timing just before the opening-closing member reaches a mechanically limit position in a closing direction of the opening-closing member.

The supply of drive force to the drive device may be stopped after a position of the opening-closing member relative to the opening portion is changed due to the pressing of the opening-closing member against the elastic member. In this case, the opening-closing member continues to move until the position of the opening-closing member relative to the opening portion changes, after a part (end) of the opening-closing member starts to press the elastic member. Therefore, an entire of the end part of the opening-closing member can be in contact with the elastic member with pressing the elastic member. An impact noise at the time of closing can be reduced while sealing of the opening portion is ensured.

The step of stopping supply of drive force to the drive device may be performed just before an end portion of the opening-closing member opposite from the elastic member moves in a direction perpendicular to a flat surface of the opening-closing member. As a result, the end portion of the opening-closing member opposite from the elastic member can be prevented from moving in the direction perpendicular to the flat surface of the opening-closing member, or can be confined to a small moving range. Therefore, a sealing performance can be ensured certainly.

As described above, according to the opening-closing control method of the present disclosure, the load detector detects the increase of load on the opening-closing member near the fully closed position of the opening portion. Thus, it can be prevented that the opening-closing member stops at the middle of the opening portion. The opening-closing control method includes the step of detecting the increase of load on the opening-closing member when the opening-closing member is located near the fully closed position, and the step of stopping supply of drive force to the drive device after the detection of the increase of load and just before the opening-closing member reaches the mechanically limit position in the closing direction of the opening-closing member. An end portion of the opening-closing member in its closing direction and the elastic member can be made to be in contact with each other with pressing against each other entirely. As a result, a sealing performance can be ensured. Furthermore, the supply of drive force is stopped after the detection of the increase of load and just before the opening-closing member reaches the mechanically limit position in the closing direction. Thus, an impact noise due to contact between the opening-closing member and an inner end portion of the opening portion can be prevented, and stress on the drive system driving the opening-closing member can be avoided.

According to another aspect of the present disclosure, a method is for driving an opening-closing member with use of a drive device and controlling the opening-closing member to open or close an opening portion. In the method, it is determined whether an end portion of the opening-closing member reaches a predetermined position at which a fully-closing control is started to be performed, and a load on the opening-closing member due to contact between the opening-closing member and an elastic member disposed on an end of the opening portion is detected after the opening-closing member reaches the predetermined position. Moreover, it is determined whether the load reaches a predetermined threshold lower than a load value at which the opening-closing member reaches a mechanically limit position, and the supply of electric power to the drive device is stopped after the load reaches the predetermined threshold.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

An exemplar embodiment of the present disclosure will be described hereinafter referring to FIGS. 1 to 5.

Figure 1:
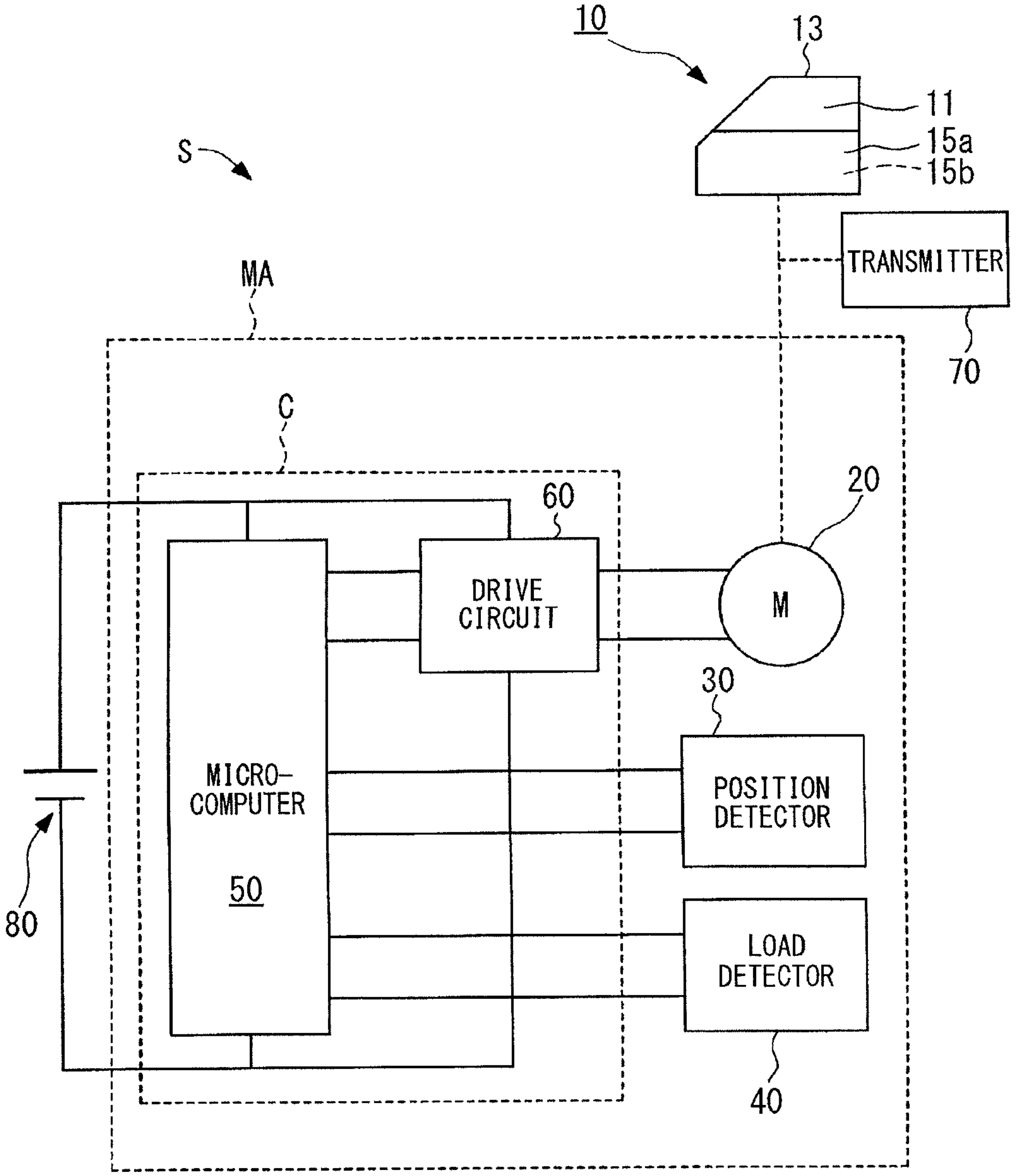
FIG. 1 is a diagram showing an electrical configuration of an opening-closing control device according to an exemplar embodiment of the present disclosure.

As shown in FIG. 1, an opening-closing control device S (power window device) of the present embodiment includes a motor assembly portion MA, a controller C incorporated into or connected to the motor assembly portion MA, a drive motor 20, a position detector 30, a load detector 40, and a microcomputer 50 which controls an operation of the drive motor 20 and performs processing of various signals and various calculations, and a drive circuit 60. The drive motor 20 may be used as an example of a part of a drive device that opens or closes a glass window 11 disposed in a door 10 of a vehicle. The microcomputer 50 may be used as an example of a load change detection portion and an example of a stop command portion. The drive circuit 60 may be used as an example of a drive-force stopping device that stops supply of drive force to the drive device. Rotary drive force is transmitted from the drive motor 20 to the glass window 11 via a drive force transmitter 70 in accordance with operations of switches (down switch, up switch and auto switch) which are used for commanding operations of the glass window 11 by a passenger. The glass window 11 is moved up or down (i.e., opened or closed) by the rotary drive force.

Figure 6A:
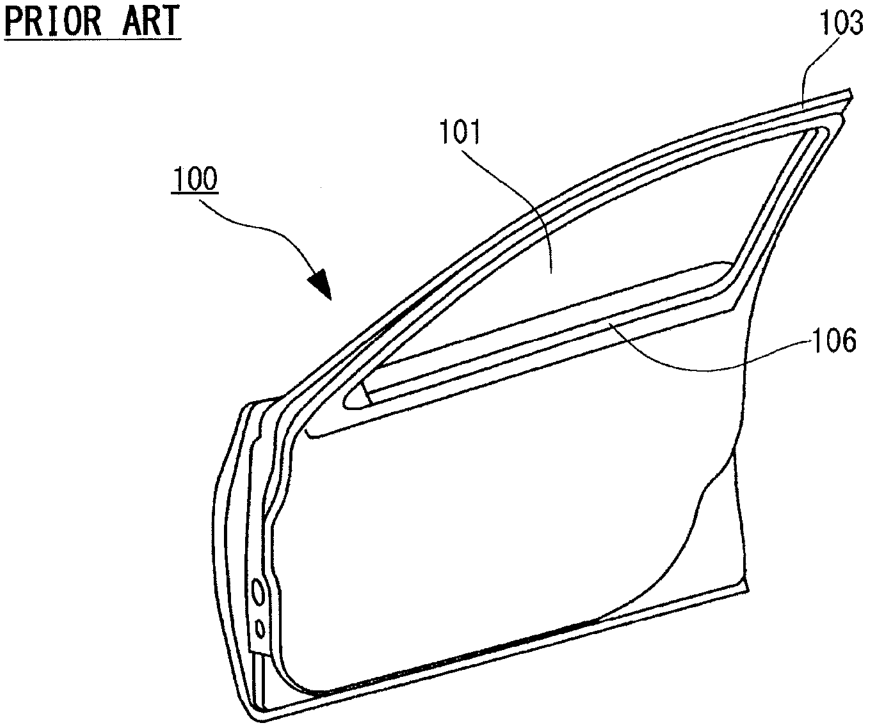
FIG. 6A PRIOR ART
FIG. 6A is a view showing a door for a vehicle according to a conventional technology.
Figure 6B:
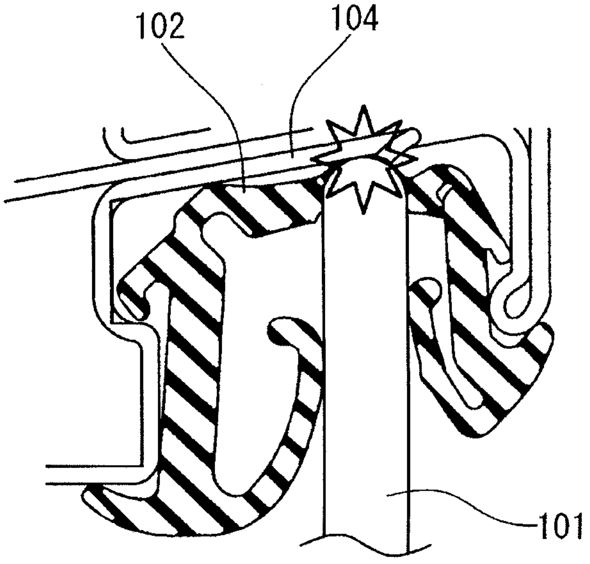
FIG. 6B PRIOR ART
FIG. 6B is a sectional view of a part of the door according to the conventional technology.
Figure 7A:
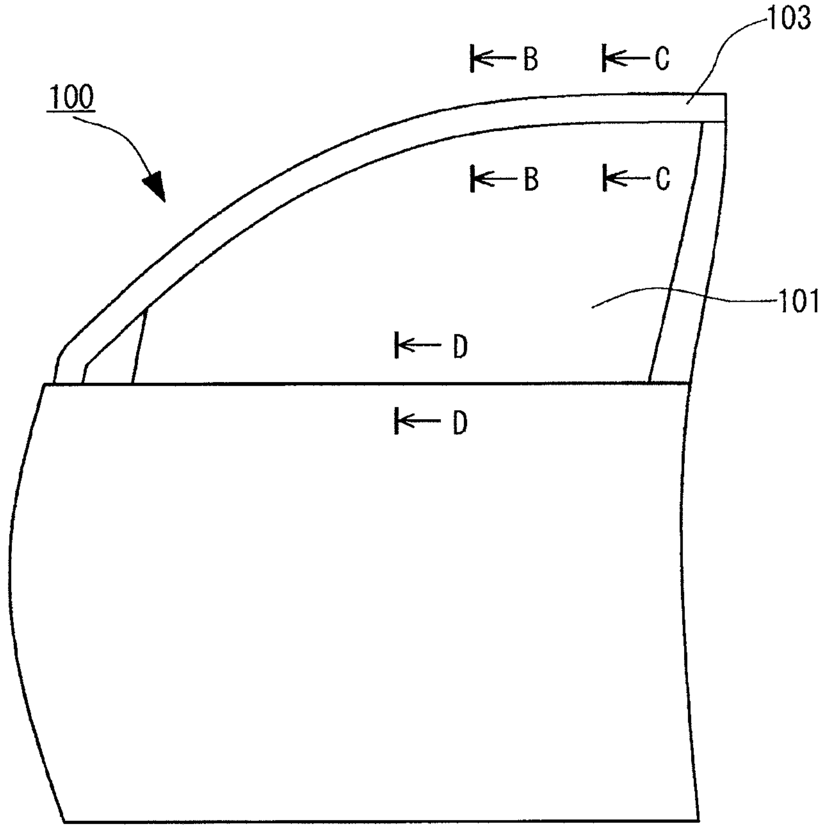
FIG. 7A PRIOR ART
FIG. 7A is a view showing a door for a vehicle according to the conventional technology.
Figure 7B:
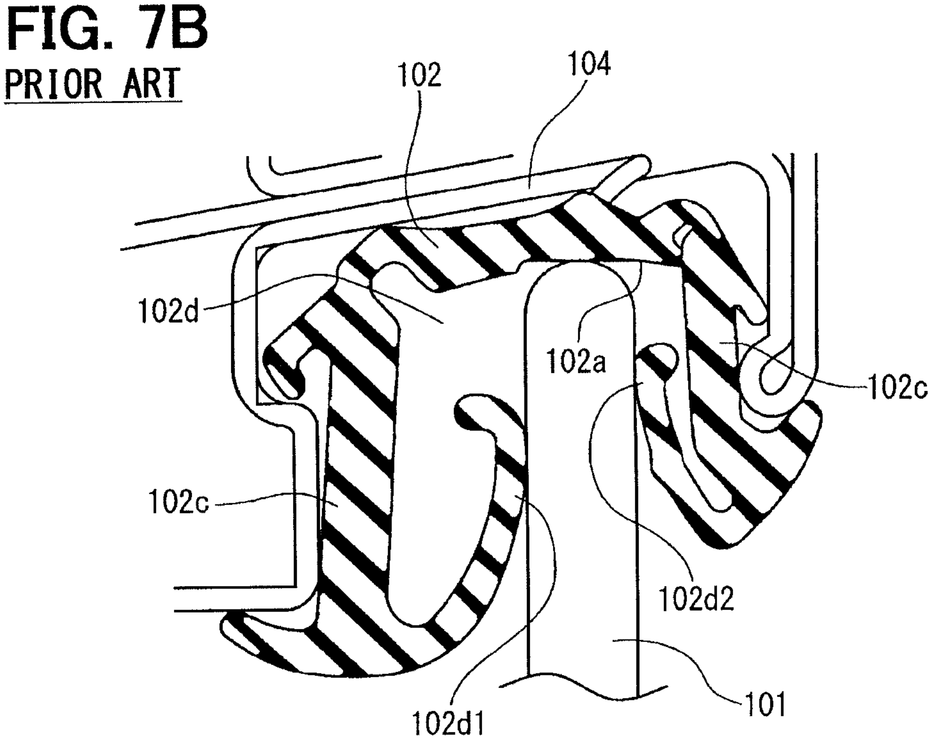
FIG. 7B PRIOR ART
FIG. 7B is a sectional view taken along a line B-B of FIG. 7A.
Figure 7C:
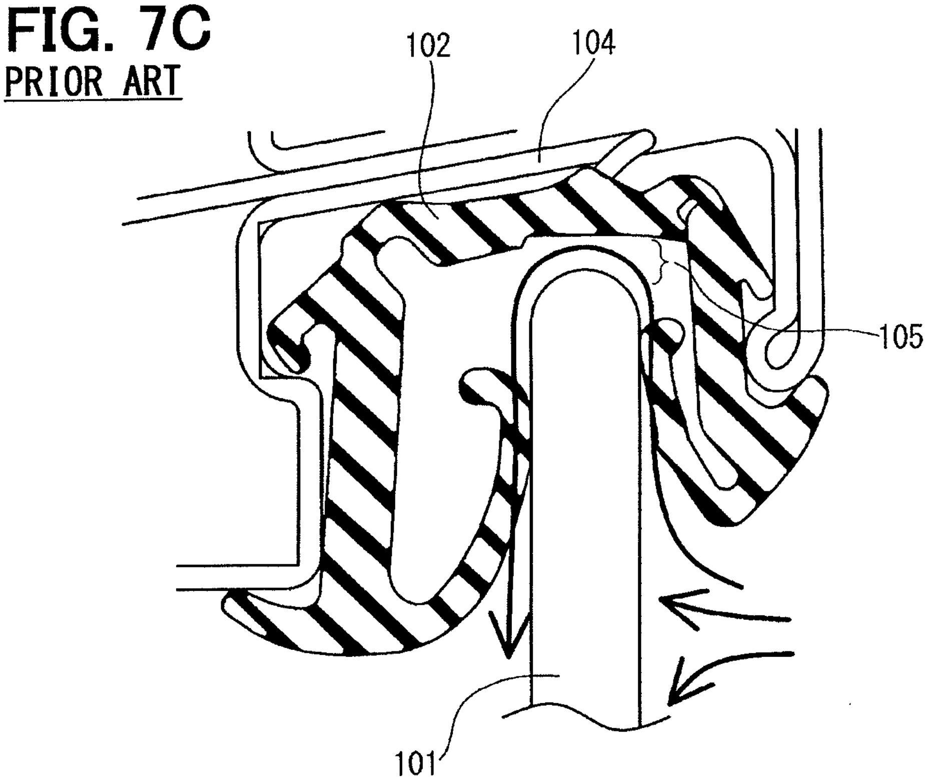
FIG. 7C PRIOR ART
FIG. 7C is a sectional view taken along a line C-C of FIG. 7A.
Figure 7D:
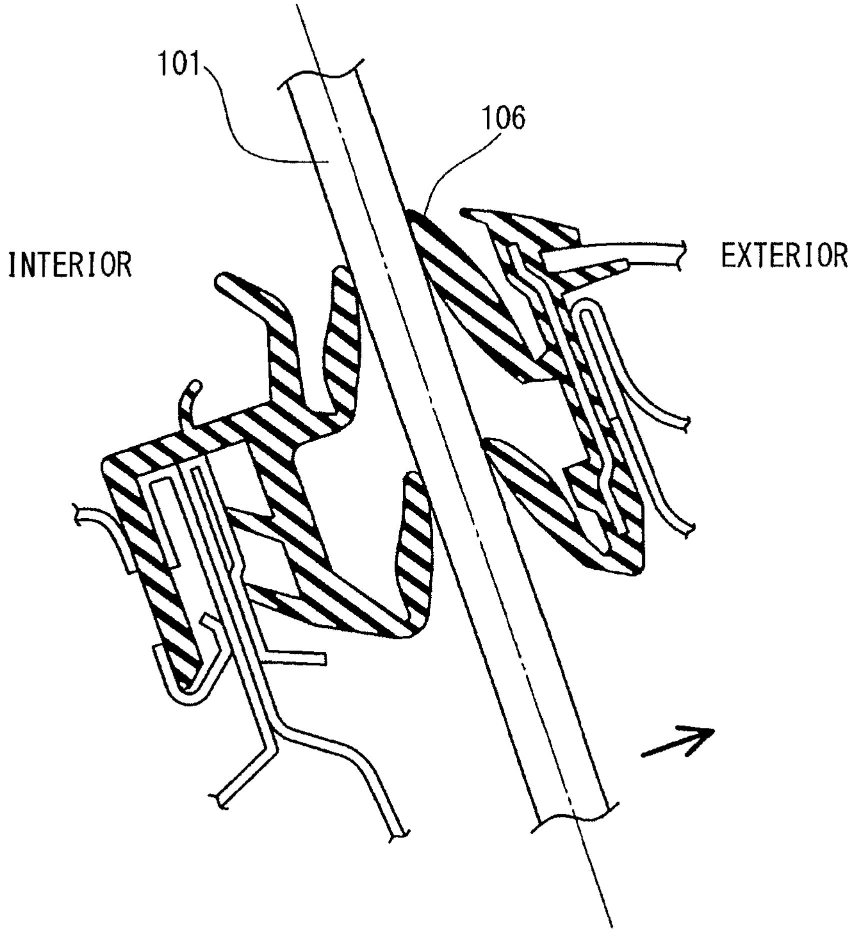
FIG. 7D PRIOR ART
FIG. 7D is a sectional view taken along a line D-D of FIG. 7A.

The door 10 of the present embodiment is similar to a door shown in FIG. 6 and includes an outer panel 15*a* provided on an outer side of the vehicle in a vehicle-width direction, an inner panel 15*b* provided on an inner side of the vehicle in the vehicle-width direction, and an accommodation space capable of accommodating the glass window 11 therein. The accommodation space is a space in a width direction of the door 10 and accommodates the glass window 11 when the glass window 11 is located at its lowermost position. The door 10 further includes a window frame 13 positioned on an upper side of the outer panel 15*a* and the inner panel 15*b*. When the glass window 11 is moved up from the lowermost position, the glass window 11 passes beyond a lower frame portion of the window frame 13 and appears inside the window frame 13. A stopper 14 is provided under an upper frame portion of the window frame 13, and a glass run channel 12 is attached to the stopper 14. The glass run channel 12 is used as a sealing member. The window frame 13 may be used as an example of an opening portion that is opened or closed by lifting or lowering of the glass window 11.

Figure 3A:
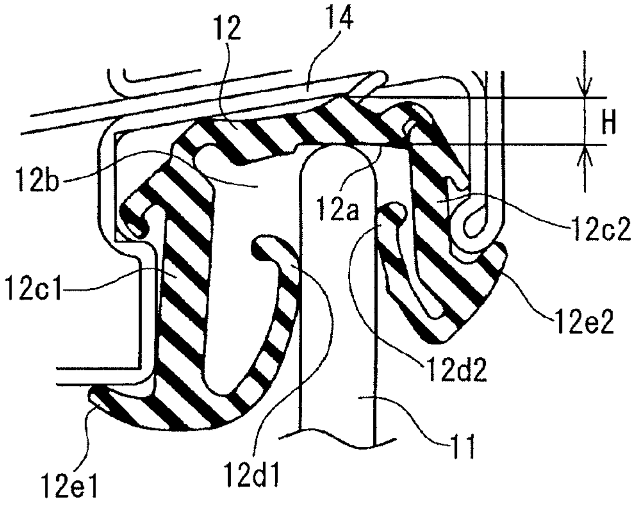
FIG. 3A is a sectional view showing a window and a glass run channel at a position α of FIG. 2.
Figure 3B:
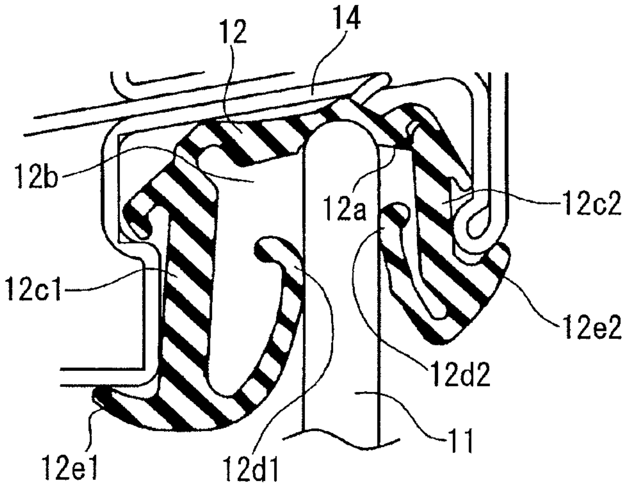
FIG. 3B is a sectional view showing the window and the glass run channel at a position β of FIG. 2.
Figure 3C:
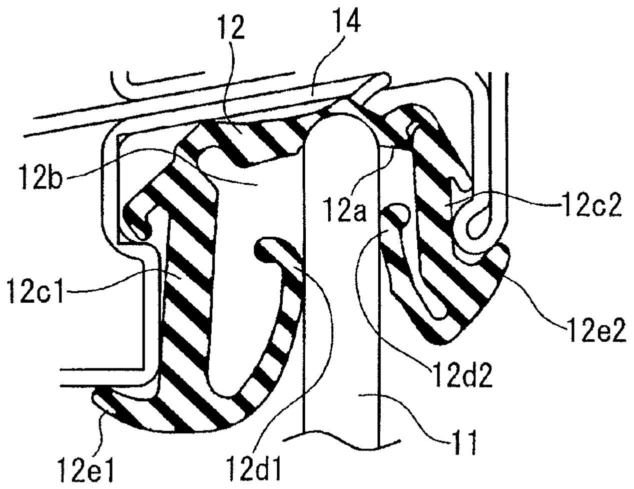
FIG. 3C is a sectional view showing the window and the glass run channel at a position γ of FIG. 2.

The glass run channel 12 of the present embodiment is made of an elastic material such as rubber. As shown in FIGS. 3A to 3C, the glass run channel 12 has a groove portion 12*b* (space portion) having an opening downward. The glass run channel 12 includes a base portion 12*a*, an inner side portion 12*c*1 extending downward from an inner end part of the base portion 12*a*, and an outer side portion 12*c*2 extending downward from an outer end part of the base portion 12*a*. Thus, the base portion 12*a*, the inner side portion 12*c*1 and the outer side portion 12*c*2 define the groove portion 12*b*. The glass run channel 12 further includes an inner lip portion 12*d*1 extending from a lower end part of the inner side portion 12*c*1 into the groove portion 12*b* with curving upward, and an outer lip portion 12*d*2 extending from a lower end part of the outer side portion 12*c*2 into the groove portion 12*b* with curving upward. The inner lip portion 12*d*1 and the outer lip portion 12*d*2 press against each other in the groove portion 12*b*. The base portion 12*a*, the inner side portion 12*c*1, the outer side portion 12*c*2, the inner lip portion 12*d*1 and the outer lip portion 12*d*2 are integrated. When the glass window 11 is inserted into the groove portion 12*b*, the glass window 11 is sandwiched between the inner lip portion 12*d*1 and the outer lip portion 12*d*2 and is pressed from both sides in the vehicle-width direction due to elasticity of the glass run channel 12. The glass run channel 12 further includes an inner protrusion portion 12*e*1 protruding from the lower end part of the inner side portion 12c1 to an opposite side from the inner lip portion 12d1, and an outer protrusion portion 12e2 protruding from the lower end part of the outer side portion 12c2 to an opposite side from the outer lip portion 12d2. The inner protrusion portion 12e1 and the outer protrusion portion 12e2 are engaged with the window frame 13.

The drive motor 20 of the present embodiment includes a rotator having a winding wire energized by electricity supplied from a battery 80 via the controller C including the microcomputer 50 and the drive circuit 60. The drive motor 20 further includes a stator having a magnet, and rotation force is generated between the rotator and the stator by the electricity from the battery 80. When a current direction in the winding wire is reversed, a rotation direction of the rotator is reversed correspondingly. In the present embodiment, the drive force transmitter 70, which transmits drive force from the drive motor 20 to the glass window 11, may be configured as following. For example, the drive force transmitter 70 may include a lifting arm and a driven arm, and end portions of the arms may be supported by channels slidably along the channels. In this case, the drive force transmitter 70 is driven as an X lifter so as to press the glass window 11 up or pull the glass window 11 down. Alternatively, the drive force transmitter 70 may include a bracket movable along a guide rail extending in an opening-closing direction of the glass window 11, and a wire fixed to the bracket. In this case, an end portion of the glass window 11 is held by the bracket, and the wire is wound or unwound by the drive motor 2 such that the glass window 11 is moved up or down.

The drive motor 20 of the present embodiment is provided with the position detector 30 and the load detector 40 (rotation detector). The position detector 30 detects whether the glass window 11 arrives at a predetermined position when start of a fully-closing control described later is determined. The position detector 30 outputs the detected signal to the microcomputer 50. The start of the fully-closing control is determined based on the detection. The load detector 40 outputs a pulse signal (load detection signal) synchronized with rotation of the drive motor 20. The load detector 40 of the present embodiment includes multiple hall elements capable of detecting change of magnetism of a magnet rotating together with an output shaft of the drive motor 20.

Thus, the load detector 40 outputs a pulse signal synchronized with the rotation of the drive motor 20. The pulse signal is outputted every predetermined moving distance of the glass window 11 or every predetermined rotational angle of the drive motor 20. Accordingly, the load detector 40 is capable of outputting a signal dependent on movement of the glass window 11. The movement of the glass window 11 is approximately proportional to a rotation rate of the drive motor 20. The microcomputer 50 of the controller C counts pulse edges of the pulse signal from the load detector 40 and detects a position of the glass window 11 or a rotation rate of the drive motor 20 based on the counted values. In the present embodiment, the load detector 40 and the microcomputer 50 are used as an example of a load change detection portion.

In the present embodiment, the hall elements are used for the load detector 40 (rotation detector), but not limited to this. An encoder may be used if the encoder is capable of detecting the rotation of the drive motor 20. Alternatively, a drive motor is energized, and a ripple current generated when energization of the wire is switched may be detected. A wave profile of the ripple current may be detected for detecting the rotation rate or rotation position (position of opening-closing member).

The microcomputer 50 of the present embodiment includes a central processing unit (CPU), memories such as a read-only memory (ROM) and a random access memory (RAM), an input circuit and an output circuit. The CPU is connected to the memories, the input circuit and the output circuit via a bus. The microcomputer 50 is connected to an ECU of the vehicle with wire (e.g., harness) or without wire. The microcomputer 50 may be configured by a digital signal processor and may be provided by gate array.

The microcomputer 50 of the present embodiment includes a portion which receives and processes a signal from the position detector 30 and determines the start of the fully-closing control, and a portion (load change detection portion) which receives and processes a signal from the load detector 40 and detects a load change. The microcomputer 50 further includes a portion which determines a start of the load change when a load reaches a predetermined value, and a portion (stop command portion) which commands the glass window 11 that is an example of the opening-closing member to stop just before a mechanical-movement limit position from a start of the load change within a detection range of the load change. The microcomputer 50 outputs a signal of the stop command portion to the drive circuit 60 and stops supply of electricity to the drive motor 2, thereby stopping the movement of the glass window 11. The battery 80 disposed in the vehicle supplies necessary electric power to the microcomputer 50, the drive circuit 60 and the drive motor 20 of the controller C for actuations and operations of the microcomputer 50, the drive circuit 60 and the drive motor 20.

The microcomputer 50 rotates the drive motor 20 positively or negatively via the drive circuit 60 based on an operational signal from the switches (including a down switch, an up switch and an auto switch) in a normal state of the power window device. Accordingly, the glass window 11 is moved to be open or closed. The microcomputer 50 may detect a position of the glass window 11 by performing a processing based on a reference position of the glass window 11 fully open (or fully closed) and based on a pulse signal from the load detector 40 (rotation detector). Additionally, the microcomputer 50 may adjust a magnitude of driving electric power supplied to the drive motor 20 via the drive circuit 60 depending on the detected position of the glass window 11. In this case, the load detector 40 can be used also as the position detector 30.

The microcomputer 50 detects a rising edge and a falling edge (pulse edge) of an inputted pulse signal and calculates a rotation rate (rotation period) of the drive motor 20 based on intervals (periods) of the pulse edges. Moreover, the microcomputer 50 detects a rotation direction of the drive motor 20 based on a phase difference of each pulse signal. Hence, the microcomputer 50 indirectly calculates a moving speed of the glass window 11 based on the rotation rate (rotation period) of the drive motor 20 and specifies a moving direction of the glass window 11 based on the rotation direction of the drive motor 20. Since the microcomputer 50 counts the pulse edges, the number of pulse counts is increased or decreased in accordance with opening or closing operation of the glass window 11. The microcomputer 50 specifies a position of the glass window 11 based on the number of pulse counts.

Thus, in the present embodiment, the glass window 11 can be driven by using a fully closed position of the glass window 11 as the reference position. When the fully closed position is used as the reference position, the number of pulse counts is set at zero at the fully closed portion. After the setting of the number of pulse counts at zero at the fully closed position, the microcomputer 50 increases the number of pulse counts by 1 every time the microcomputer 50 receives a pulse signal when the glass window 11 moves toward one end side of an operational region (moving zone), for example, toward a fully open position of the glass window 11. The microcomputer 50 decreases the number of pulse counts by 1 every time the microcomputer 50 receives a pulse signal when the glass window 11 moves toward the other end side of the operational region, for example, toward the fully closed position of the glass window 11.

The glass window 11 may be driven by using the fully open position as the reference position. In this case, the number of pulse counts may be set at zero at the fully open position, and may be increased when the glass window 11 is moved toward the fully closed position. The number of pulse counts may be decrease when the glass window 11 is moved toward the fully open position.

In the present embodiment, a load on the glass window 11 and whether the load on the glass window 11 is changed are monitored based on change of the rotation rate of the drive motor 20, which is relevant to the moving speed of the glass window 11. Alternatively, for example, the load on the glass window 11 and whether the load on the glass window 11 is changed may be detected by monitoring change of a value of electric current flowing in the drive motor 20 being driven. When the detected current value increases and excesses a predetermined current value, the stop command portion of the microcomputer 50 may output a signal to the drive circuit 60 to stop movement of the glass window 11. Accordingly, power feeding to the drive motor 20 may be stopped, and movement of the glass window 11 may be stopped. When the electric current value is used for monitoring the load state of the window 11 as above, the microcomputer 50 detects a rising edge and a falling edge of an inputted electric current value and derives a load of electric current on the drive motor 20 from the detected results. The microcomputer 50 detects the rotation direction of the drive motor 20 based on a flow direction of the electric current. In other words, the microcomputer 50 indirectly calculates the moving speed of the glass window 11 based on the electric current value supplied to the drive motor 20 and specifies the moving direction of the glass window 11 based on the rotation direction of the derive motor 20.

The drive circuit 60 includes an integrated circuit (IC) having a field effect transistor (FET) and switches polarity of electricity supplied to the drive motor 20 based on a signal inputted from the microcomputer 50. When the drive circuit 60 receives a signal from the microcomputer 50 to rotate the drive motor 20 positively, the drive circuit 60 supplies an electric power to the drive motor 20 so as to rotate the drive motor 20 positively. When the drive circuit 60 receives a signal from the microcomputer 50 to rotate the drive motor 20 negatively, the drive circuit 60 supplies an electric power to the drive motor 20 so as to rotate the drive motor 20 negatively. When the drive circuit 60 receives a signal from the stop command portion of the microcomputer 50, the power supply to the drive motor 20 is stopped. The drive circuit 60 may switch the polarity of electricity supplied to the drive motor 20 by using a relay circuit. The drive circuit 60 may be incorporated into the microcomputer 50.

Figure 2:
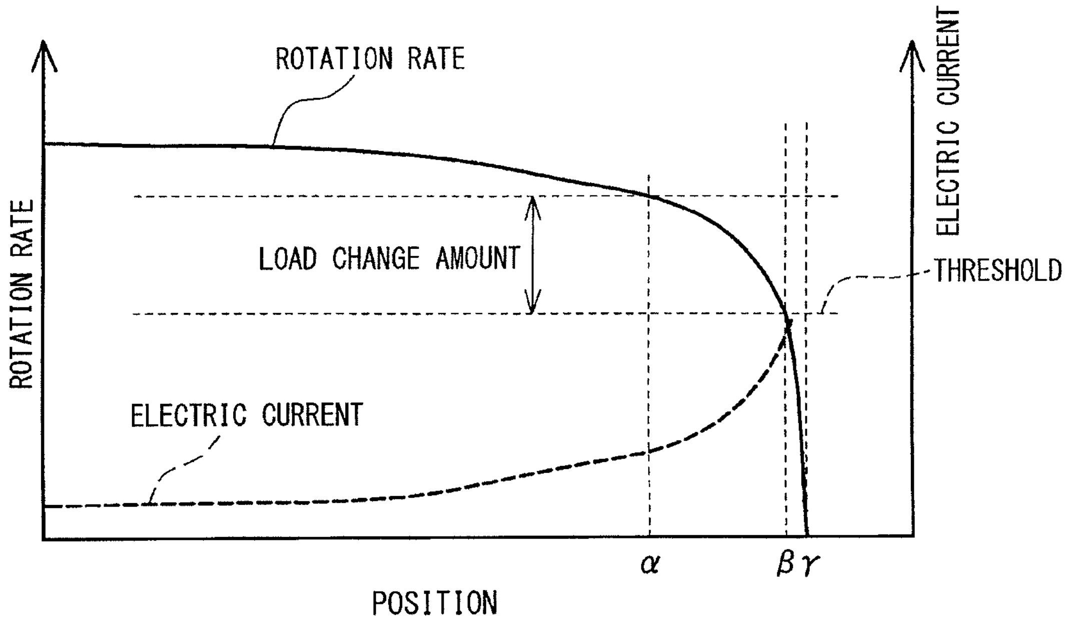
FIG. 2 is a diagram showing a relationship among a rotation rate of a drive motor, an electric current applied to the drive motor, and a position of an end portion of a window.

FIG. 2 shows a profile of the rotation rate of the drive motor 20 when the drive motor 20 is moved from a lower end position (fully open position) to a higher end position (fully closed position). FIG. 3A shows a relationship between an end portion of the glass window 11 and the glass run channel 12 at the position α of FIG. 2. FIG. 3B shows when the rotation rate falls below a threshold at the position β of FIG. 2. When the rotation rate becomes lower than the threshold, the power supply to the drive motor 20 is stopped. An end of the glass window 11 is in contact with the glass run channel 12 at the time of stopping of the power supply, and the glass window 11 is thereby stopped promptly. FIG. 3C shows when the window 11 is stopped at the position γ of FIG. 2. Thus, the position β and the position γ are slightly away from each other. When the threshold is defined by the electric current value instead of the rotation rate, similar results are obtained. For example, when the electric current value in the drive motor 20 exceed the threshold at the position β of FIG. 2, the power supply to the drive motor 20 is stopped. Since the end of the glass window 11 is in contact with the glass run channel 12 at the position β as is the case with the rotation rate, movement of the glass window 11 is promptly stopped. As a result, the glass window 11 is located at the position γ of FIG. 2. Also in this case, the position 8 and the position γ are slightly away from each other. Therefore, in the present embodiment, the load on the glass window 11 and the load change are monitored by detecting the rotation rate of the drive motor 20 or the electric current value supplied to the drive motor 2.

In the present embodiment, when the glass window 11 is fully closed, the end of the glass window 11 is controlled to stop at a position within a thickness range H of the glass run channel 12 attached to the stopper 14 as shown in FIGS. 3A to 3C. The window 11 that is an example of the opening-closing member is, for example, moved in a closing direction with tilting slightly from the closing direction, and the glass window 11 then contacts the glass run channel 12 to be a fully-closed state. In this case, when the glass window 11 has a flaw, the glass window 11 may have a first contact portion that contacts the glass run channel 12 firstly, and a second contact portion that contacts the glass run channel 12 after the contact of the first contact portion with the glass run channel 12. If the drive motor 20 further moves the glass window 11 up after the contact of the first contact portion, the first contact portion may provide excess deformation to a part of the glass run channel 12. If the drive motor 20 is driven furthermore, an upper end of the first contact portion of the window 11 may contact the stopper 14 via the glass run channel 12, and excess load may be provided to the drive motor 20. On the other hand, in the present embodiment, the glass window 11 is controlled such that the end of the glass window 11 contacts the glass run channel 12 without excessively pressing and collapsing the glass run channel 12. Even when the glass window 11 has a flaw, the glass window 11 is controlled such that an entire upper end side of the glass window 11 contacts the glass run channel 12 in the present embodiment. Accordingly, sealing performance can be ensured. Additionally, in the present embodiment, the glass window 11 is controlled to be stopped before providing an impact on the stopper 14.

Next, a stopping control will be described with reference to FIGS. 2 to 5. When the non-shown up switch is continuously operated to be in an ON state, the drive motor 20 is driven to move the glass window 11 up. During the moving up of the glass window 11, the rotation rate of the drive motor 20 is calculated at step S1. According to the calculation, a moving state or a moving distance of the glass window 11 is calculated, and a position of the end portion of the glass window 11 is monitored. The drive motor 20, which drives the glass window 11, continues to rotate positively until the load on the drive motor 20 changes. When the up switch is turned OFF during the moving up of the glass window 11, the microcomputer 50 outputs a stop signal to the drive circuit 60, and the drive circuit 60 shuts the power supply to the drive motor 20. As a result, the drive motor 20 is stopped, and the movement of the glass window 11 is stopped.

The calculation of the rotation rate of the drive motor 20 at step S1 is performed as following. The microcomputer 50 processes a pulse signal from the load detector 40 and detects a pulse edge. Every time the microcomputer 50 detects a pulse edge, the microcomputer 50 calculates a pulse width T that is a time interval between a newly-detected pulse edge and a lastly-detected pulse edge, and stores the pulse width T in the memory sequentially. In the present embodiment, the pulse width T is updated in order every time a new pulse edge is detected. For example, latest four pulse widths T(0) to T(3) are stored in the memory. When a pulse edge is detected, the pulse width T(0) is newly calculated, last three pulse widths T(0) to T(2) are shifted by one to pulse widths T(1) to T(3) respectively, and the last pulse width T(3) is deleted.

The microcomputer 50 calculates a rotation rate ω from the reciprocal of the sum (pulse period P) of pulse widths T of n sequential pulse edges. The rotation rate ω is proportional to the actual rotation rate of the drive motor 20. In the present embodiment, the microcomputer 50 calculates a rotation rate ω(0) (average rotation rate) from pulse widths T(0) to T(3) which are obtained from latest five sequential pulse edges. When a next pulse edge is detected, the rotation rate ω(0) is updated based on newly-stored pulse widths T(0) to T(3) and is stored as a rotation rate ω(1). The microcomputer 50 continuously stores therein latest eight rotation rates ω(0) to ω(7) which are updated every time a pulse edge is detected (every predetermined moving distance or every predetermined rotation angle). Since the rotation rate ω is calculated from multiple pulse widths in the present embodiment, variation of duty cycles of pulse signals in a receiving sensor can be balanced out, and fluctuation of the rotation rate due to error can be cancelled.

Figure 5:
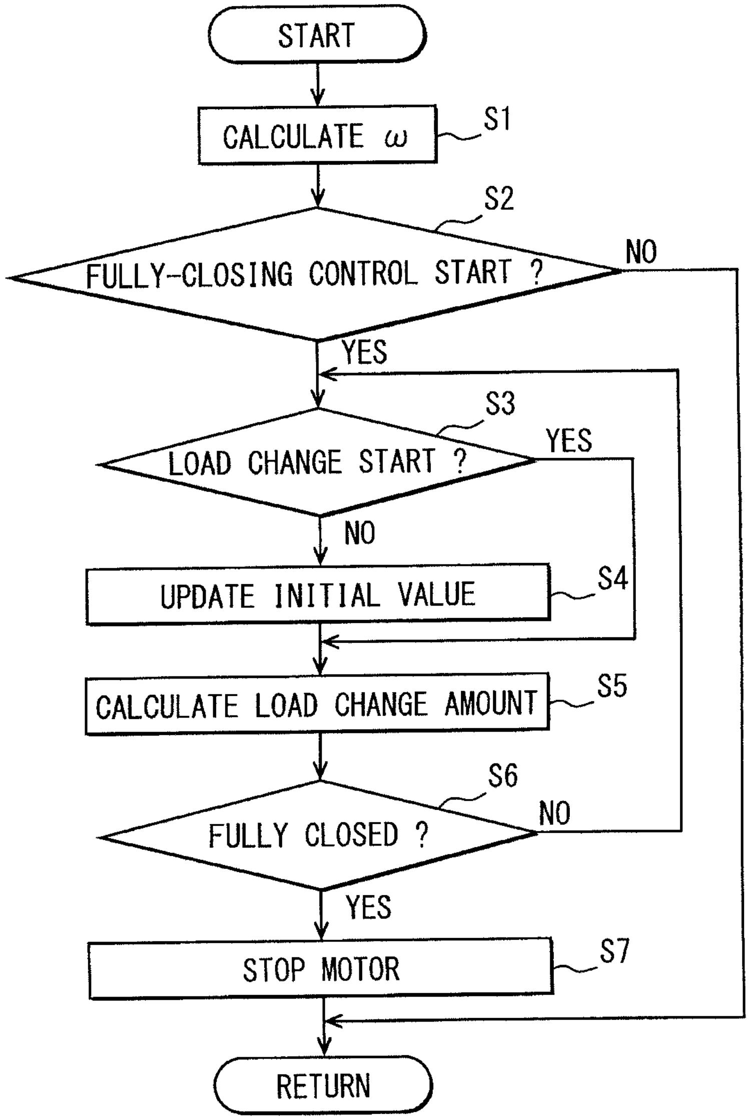
FIG. 5 is a flowchart showing a control of the opening-closing control device.

At next step S2, a start of the fully-closing control is determined by determining whether the glass window 11 moves up to a predetermined position. The start of the fully-closing control is determined by using an element (hall IC) for position detection. Thus, the start of the fully-closing control is determined by a signal from the position detection element. When the glass window 11 does not move up to the predetermined position at step S2 (step S2: NO), the control process shown in FIG. 5 is terminated and started from step S1. The position detector may detect a position of the glass window 11 by carrying out an operation based on a pulse signal from the load detector 40 (rotation detector).

When the glass window 11 moves up to the predetermined position at step S2 (step S2: YES), a start of load change is determined at step S3. For example, the microcomputer 50 may determines that load on the glass window 11 starts to change when a rotation rate difference Δω described below is higher than or equal to a predetermined value. The microcomputer 50 may determines that the load on the glass window 11 does not start to change yet when the rotation rate difference Δω is lower than the predetermined value. Additionally, at step S3, an initial change amount A0 of the rotation rate ω before the start of the load change is calculated by accumulating the rotation rate differences Δω, and a substantial change amount A1 of the rotation rate ω after the start of the load change is calculated by subtracting the initial change amount A0 from a total amount of the rotation rate differences Δω. Accordingly, a change amount (A1) of the rotation rate due to the load change, i.e. a load change amount can be calculated certainly. The load change start may be determined at step S3 based on change of the rotation rate of the drive motor 20 or change of the electric current value in the drive motor 20. The microcomputer 50 calculates the (average) rotation rate difference Δω (rotation rate change ratio) from the rotation rate ω. More specifically, the rotation rates ω(0) to ω(3) are defined as a present block data, and the rotation rates ω(4) to ω(7) are defined as a previous block data. The microcomputer 50 performs a process to obtain a difference between a sum of the present block data and a sum of the previous block data. In other words, the rotation rate difference Δω is calculated by subtracting the sum of the rotation rates ω(0) to ω(3) from the sum of the rotation rates ω(4) to ω(7). The rotation rate difference Δω is updated every time a pulse edge is detected (every predetermined moving distance or every predetermined rotation angle). The calculated value may be divided by the number of data summed. Phase differences between rotation rates ω can be cancelled by calculating the rotation rate difference Δω based on multiple rotation rates ω. The microcomputer 50 starts to accumulate the calculated rotation rate differences Δω when the glass window 11 reaches a predetermined reference position. Therefore, a change amount of the rotation rate ω from the reference position can be calculated by accumulating the rotation rate difference Δω every time the rotation rate difference Δω is calculated.

When the load change is determined to be started at step S3 (step S3: YES), a process of calculation of the load change amount is performed at step S5. In this case, the load change is started already, and thus the calculation process of the load change amount is performed at step S5. In the calculation process of the load change amount at step S5, the microcomputer 50 calculates the rotation rate difference Δω (rotation rate change ratio) from the rotation rate ω, similar to the determination of the load change start at step S3.

When the load change is determined not to be started at step S3 (step S3: NO), an initial value updating is performed at step S4. In the case where the load change is detected by monitoring the rotation rate of the drive motor 20, the initial value updating of step S4 means updating of an initial value of the rotation rate at a start of the load change. When the load change is detected for the first time (i.e., when the load change starts), the rotation rate difference Δω is calculated with reference to the rotation rate ω at this detection time, and the load change is calculated. When the load change is determined not to start at step S3, the initial value updating is performed to update the referenced rotation rate ω to a state just before a start of the load change. After the updating of step S4, the calculation process of the load change amount is performed at step S5. Accordingly, the change amount of the rotation rate ω from a start of the load change is calculated by calculating the change amount from the referenced value. When the load change is determined not to start, the accumulated value of the rotation rate differences Δω is initialized by the above-described initial value updating. When the load change is determined to start, the accumulated value of the rotation rate differences Δω is not initialized.

When the load change is determined to start at step S3, the load change amount is calculated at step S5. This calculation may be performed by calculating the substantial change amount A1 of the rotation rate ω. Specifically, the initial change amount A0 before the start of the load change is calculated by summing the rotation rate differences Δω, and the substantial change amount A1 of the rotation rate ω after a start of the load change is calculated by subtracting the initial change amount A0 of the rotation rate ω from the total amount of the rotation rate differences Δω. Accordingly, the change amount of the rotation rate (i.e., load change amount) can be calculated certainly.

After the calculation of the load change amount at step S5, the fully-closing determination is performed at step S6. It is determined in the fully-closing determination at step S6 whether the load change amount exceeds a predetermined threshold. The predetermined threshold is corrected in accordance with the load change or the initial value updating based on a standard value stored in the above-described ROM.

When the load change amount is determined not to exceed the predetermined reference value at step S6 (step S6: NO), the determination of step S3 is performed.

When the load change amount is determined to exceed the predetermined reference value at step S6 (step S6: YES), a stop operation of the drive motor 20 is performed at step S7. In the stop operation of the drive motor 20, the microcomputer 50 outputs a signal to the drive circuit 60 and controls the power supply to the drive motor 20. Accordingly, the microcomputer 50 stops operation of the drive motor 20 and stops the glass window 11 from moving up. Since the load change is detected by monitoring change of the rotation rate of the drive motor 20 or change of the electric current value of the drive motor 20, the drive motor 20 can be stopped before locked current flows in the drive motor 20. In other words, the glass window 11 that is an example of the opening-closing member can be stopped certainly before the glass run channel 12 is crushed completely. Therefore, as shown in FIG. 3C, the drive motor 20 can be stopped before the glass window 11 reaches a mechanically limit position where the glass run channel 12 is crushed completely. The movement of the glass window 11 is stopped before the glass window 11 reaches the mechanically limit position where the glass run channel is crushed completely. Hence, the glass window 11 is not further pressed up, and the glass window 11 can be prevented from moving outward in the width direction of the vehicle. Since positions of a belt mold and the glass window 11 can be kept normal, a flow of wind during running can be stabilized and wind noise can be limited.

Figure 4A:
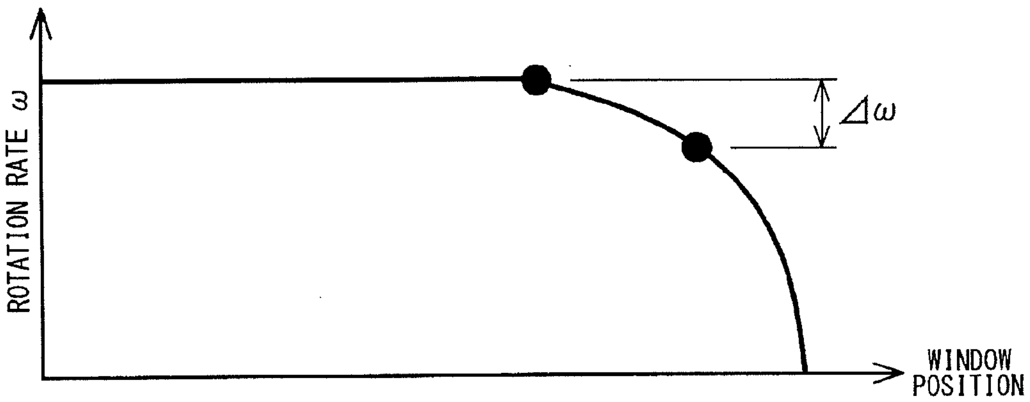
FIG. 4A is a diagram showing a relationship between the rotation rate of the drive motor and the position of the end portion of the window.
Figure 4B:
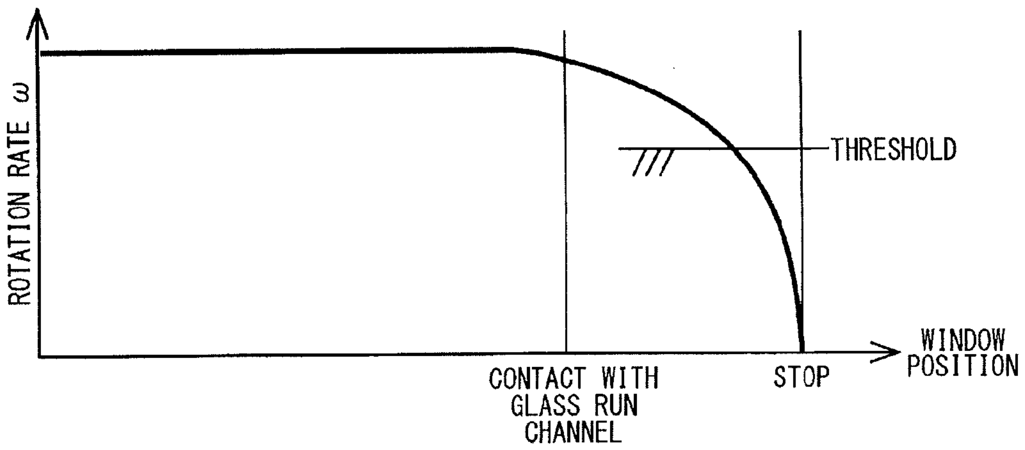
FIG. 4B is a diagram showing a part of FIG. 4A.

In FIGS. 4A and 4B, the threshold of the rotation rate ω (threshold of rotation rate difference Δω) is provided between a position where the glass window 11 contacts the glass run channel 12 and a locked stop position that is the mechanically limit position. Accordingly, it is determined whether a change amount of the rotation rate ω becomes lower than the threshold, in other words, it is determined whether the rotation rate difference exceeds the threshold. When the rotation rate difference Δω exceeds the threshold, the stop operation of the drive motor 20 is performed promptly. In the present embodiment, the load (the rotation rate or the electric current of the drive motor 20) on the glass window 11 is detected. When the load increases and exceeds the predetermined threshold, the power supply to the drive motor 20 is stopped. Thus, the glass window 11 can be stopped just before the locked stop position. The control of the glass window 11 is performed when the glass window 11 is located at a position near to the fully closed position. Therefore, a negative effect caused by an erroneous stop of the glass window 11 can be prevented. The drive motor 20 is stopped based on the load change just before the mechanically limit position of the glass window 1, and thus decrease in sealing performance can be prevented.

In the above-described embodiment, the power window device of a vehicle is used as an example for describing the opening-closing control device and the opening-closing control method. The opening-closing member of the opening-closing control device is not limited to the glass window. For example, the opening-closing member may be applied for an opening-closing member of a sunroof opening-closing device or an opening-closing member of a slide door opening-closing device. The opening-closing member may be used for a device capable of opening or closing an opening-closing member.

Additional advantages and modifications will readily occur to those skilled in the art. The disclosure in its broader terms is therefore not limited to the specific details, representative apparatus, and illustrative examples shown and described.

What is claimed is:

1. An opening-closing control device driving an opening-closing member with use of a drive device and controlling the opening-closing member to open or close an opening portion, the opening-closing control device comprising:

a load detector detecting an increase of load on the opening-closing member when the opening-closing member is located near a fully closed position in which the opening-closing member fully closes the opening portion, the increase of load being generated due to pressing of the opening-closing member against an elastic member that is disposed on an end of the opening portion and is opposed to the opening-closing member in a moving direction of the opening-closing member, and a drive-force stopping device stopping a drive force supplied to the drive device at a time just before the opening-closing member reaches a mechanically limit position in a closing direction of the opening-closing member when the increase of load detected by the load detector is larger than a predetermined threshold.

2. The opening-closing control device according to claim 1, wherein the drive-force stopping device stops the supply of drive force in a state where a position of the opening-closing member relative to the opening portion is changed due to the pressing of the opening-closing member against the elastic member.

3. The opening-closing control device according to claim 1, wherein the opening-closing member has a flat shape, and the drive-force stopping device stops the supply of drive force just before an end portion of the opening-closing member opposite from the elastic member moves in a direction perpendicular to a flat surface of the opening-closing member.

4. The opening-closing control device according to claim 1, wherein the drive-force stopping device stops the supply of drive force before an end portion of the opening-closing member opposite from the elastic member moves in a direction intersecting with the moving direction of the opening-closing member.

5. A method for driving an opening-closing member with use of a drive device and controlling the opening-closing member to open or close an opening portion, the method comprising:

detecting that a load on the opening-closing member is increased to a predetermined threshold when the opening-closing member is located near a fully closed position in which the opening-closing member fully closes the opening portion, the increase of load being generated due to pressing of the opening-closing member against an elastic member that is disposed on an end of the opening portion and is opposed to the opening-closing member in a moving direction of the opening-closing member; and stopping a drive force supplied to the drive device after detecting, at a timing just before the opening-closing member reaches a mechanically limit position in a closing direction of the opening-closing member.

6. The opening-closing control method according to claim 5, wherein the step of stopping supply of drive force to the drive device is performed after a position of the opening-closing member relative to the opening portion is changed due to the pressing of the opening-closing member against the elastic member.

7. The opening-closing control method according to claim 5, wherein the step of stopping supply of drive force to the drive device is performed just before an end portion of the opening-closing member opposite from the elastic member moves in a direction perpendicular to a flat surface of the opening-closing member.

8. A method for driving an opening-closing member with use of a drive device and controlling the opening-closing member to open or close an opening portion, the method comprising:

determining whether an end portion of the opening-closing member reaches a predetermined position at which a fully-closing control is started;

detecting a load on the opening-closing member due to contact between the opening-closing member and an elastic member disposed on an end of the opening portion, after the opening-closing member reaches the predetermined position;

determining whether the load reaches a predetermined threshold lower than a load value at which the opening-closing member reaches a mechanically limit position; and stopping electric power supplied to the drive device after the load reaches the predetermined threshold.

* * * * *